Dec. 22, 1964

G. C. HOWARD ETAL 3,162,245

APPARATUS FOR LINING CASING

Filed April 1, 1963

CLARENCE R. FAST
GEORGE C. HOWARD
INVENTORS.

BY Buell B. Hamilton

ATTORNEY.

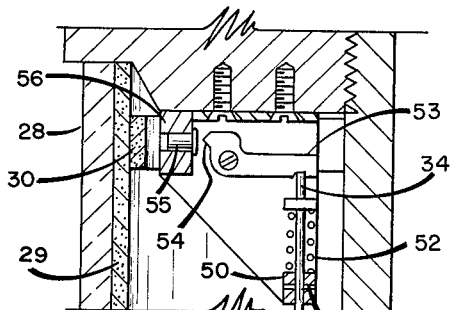
FIG.—3
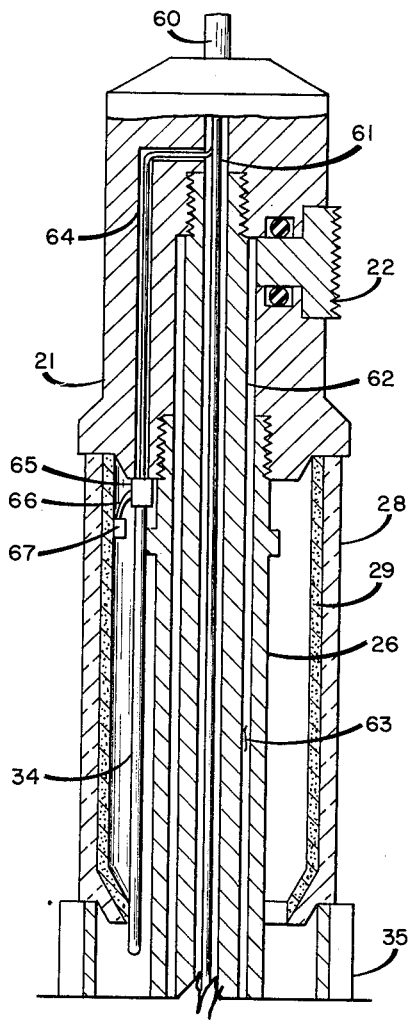
FIG.—4
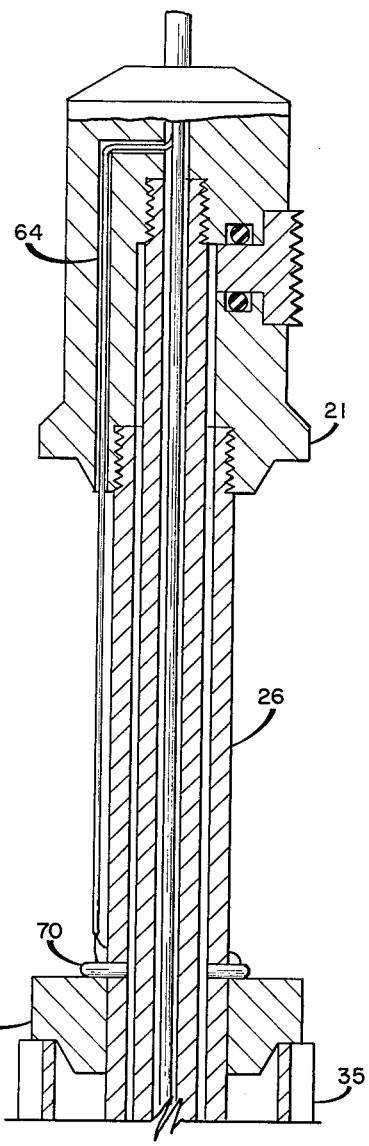
FIG.—5
CLARENCE R. FAST
GEORGE C. HOWARD
INVENTORS.
BY Buell B. Hamilton
ATTORNEY.

Dec. 22, 1964   G. C. HOWARD ETAL   3,162,245
APPARATUS FOR LINING CASING
Filed April 1, 1963   3 Sheets-Sheet 3

CLARENCE R. FAST
GEORGE C. HOWARD
INVENTORS.

BY Buell C. Hamilton

ATTORNEY.

United States Patent Office 3,162,245
Patented Dec. 22, 1964

3,162,245
APPARATUS FOR LINING CASING
George C. Howard and Clarence R. Fast, Tulsa, Okla., assignors to Pan American Petroleum Corporation, Tulsa, Okla., a corporation of Delaware
Filed Apr. 1, 1963, Ser. No. 269,535
12 Claims. (Cl. 166—63)

This invention relates to setting a metallic liner inside casing in a well. More particularly, it relates to a method and apparatus for performing such an operation in which the problem of pressing the last portion of the liner against the casing is overcome.

A new method and apparatus for forming a liner in a casing or other pressure vessel is described in U.S. patent application S.N. 216,949, filed by R. P. Vincent on July 10, 1961. The method and apparatus have been widely used with the apparatus supported on well tubing. In this method, an expander tool is run through a corrugated tube to expand the corrugated tube into a substantially cylindrical shape pressed against the inside surface of the casing. The expansion is performed by forcing through the liner an expander tool consisting of a truncated cone and a collet head with spring arms. Longitudinal movement of the liner is prevented by a retainer head at the opposite end of the corrugated tube from that which the expander tool first enters.

When the apparatus is supported on well tubing, there are few problems. Hydraulic pressure is applied through the tubing to force the expander tool through the liner until the cone comes in contact with the retainer head. This contact takes place before the expander tool has passed through the entire length of the corrugated tube. The remainder of the liner is usually expanded by one of two or three means. The simplest is to apply a pull or push on the tubing to force the expander tool through the remainder of the corrugated tube. The retainer head is not required, at this stage, to prevent movement of the corrugated tube. The portion of the liner which has already been expanded tightly against the casing resists any movement of the tube.

In another system the hydraulic pressure is released and the tubing is moved and anchored with the retainer head well separated from the corrugated tube. Hydraulic pressure is then again applied to force the expander on through the corrugated tube. Again the expanded portion of the liner prevents movement of the liner during the expansion of the last portion of the corrugated tube.

It will be apparent that there is little problem when the liner mechanism is operated on tubing in a well. If the apparatus is to be used on an uninsulated wire line or on an electric cable, however, the expansion of the last portion of the corrugated tube becomes quite a problem. U.S. patent application 216,949 describes some ways of overcoming the problem. A simple system which avoided releasing and resetting of slips or other holding mechanisms set against the casing, would, of course, be desirable, however. Some such system is particularly necessary if the wire line tool employs a gas-generating charge such as a slow-burning propellant or an acid and metal mixture where release and resetting of a slips mechanism may not be possible.

An object of this invention is to provide an apparatus and a method for expanding the last portion of a corrugated tube to form a liner in a well casing or other pressure vessel, the apparatus and method being used on a wire line, either insulated or uninsulated, and requiring a single uninterrupted application of force to the expander tool. Still other objects will be apparent to those skilled in the art from the following description and claims.

In general, we accomplish the objects of our invention by providing, in association with the retainer head, a frangible member which is broken after a portion of the liner has been set, thus permitting the expander tool to pass completely through the corrugated tube without being stopped by the retainer head.

In the drawing, FIGURE 1 is a view in cross-section of the top portion of liner setting apparatus to be used on uninsulated wire line. FIGURE 2 shows the bottom portion of the apparatus, the top of which is shown in FIGURE 1. FIGURE 3 is an enlarged view, in section, of the equipment shown in FIGURE 1 for firing an explosive for breaking the frangible member.

FIGURE 4 is a cross-sectional view of the upper portion of apparatus employing an insulated electrical cable for manipulating the tool in the well.

FIGURE 5 is a view in cross section of the upper portion of apparatus using a different type of frangible member from those shown in FIGURES 1 to 4.

Figures 6, 7:
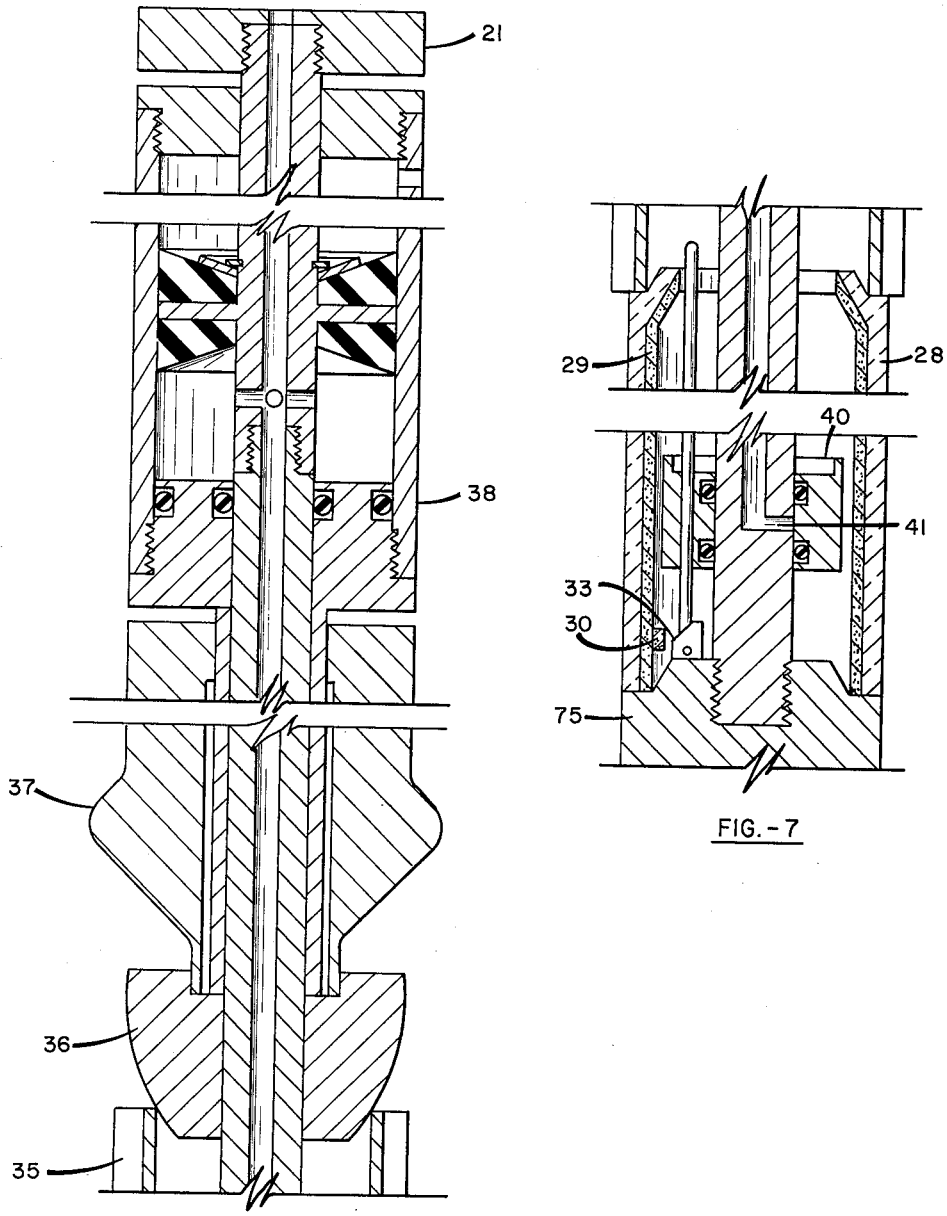

FIGURES 6 and 7 present a sectional view of the lower portion of apparatus in which the expander cone and collet head are forced downwardly through the corrugated tube rather than upwardly. FIGURE 7 shows the portion of the apparatus below that shown in FIGURE 6.

Figure 1:
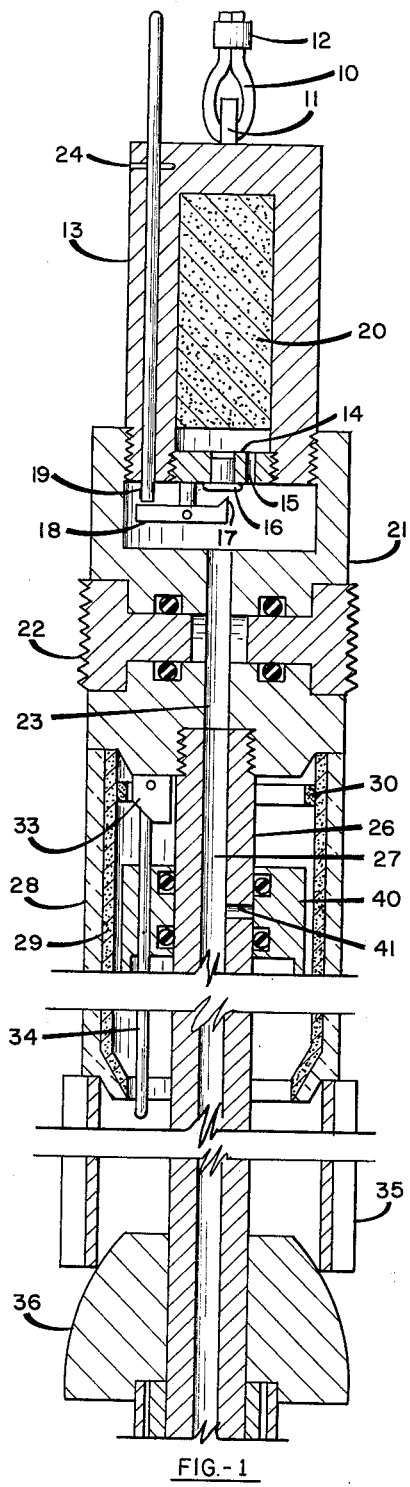

Considering the figures now in more detail, FIGURE 1 shows an apparatus supported by uninsulated wire line 10. The wire line is looped through ring 11 and fastened by clamp 12. Ring 11 supports a container 13 filled with a slow-burning propellant 20 such as ammonium nitrate in a matrix of rubber. The bottom of container 13 is closed by disk 14. The disk has an orifice 15 through which gas can escape into the space below the disk. Disk 14 also includes one or more holes of the correct size to fit a blank cartridge 16. Below each cartridge is a firing pin 17 on one end of a rocker arm 18. On the other end of the rocker arm is a rod 19 which passes through an opening in the wall of container 13 and extends to a point above clamp 12. The rod is held in place by a small shear pin 24.

Attached to the bottom of container 13 is housing 21 containing hydraulically-actuated slips 22. A central passage 23 is provided in slips housing 21 to transmit pressure to the bases of the pressure-actuated slips and to conduct fluids under pressure to the bottom portion of the apparatus. Preferably this passage, together with the connecting passages and chambers below, are filled with a liquid such as a mineral oil.

To the bottom of housing 21 polished rod 26 is attached. The rod has a central passage 27 through which pressure is transmitted to apparatus below. Passage 27 is in alignment with passage 23 in housing 21. Surrounding the upper part of polished rod 26 is a frangible cylinder 28 lined with an explosive material 29 preferably with a ring 30 of a booster explosive.

Opposite booster ring 30 is a firing mechanism 33, an example of which is shown and described in more detail in FIGURE 3. Extending below mechanism 33 is actuating rod 34 which extends to a point below frangible cylinder 28.

Figure 2:
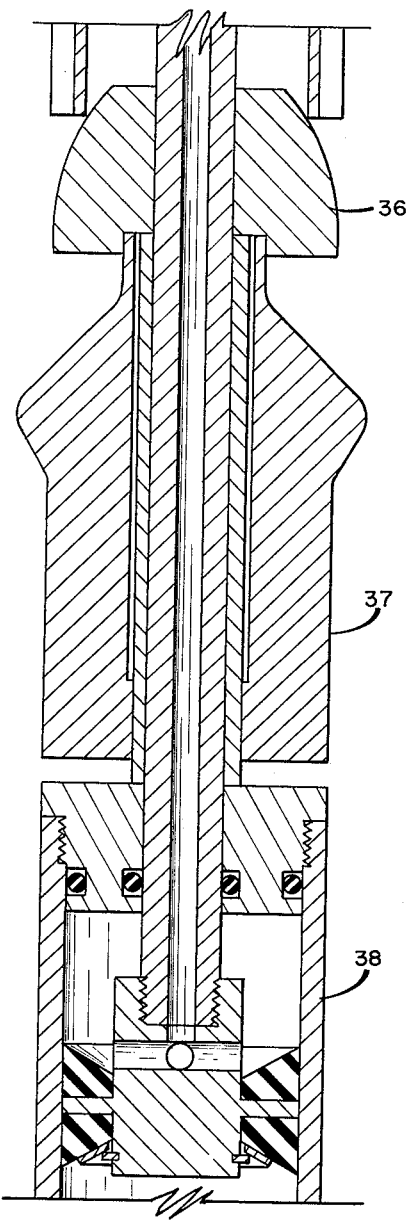

The bottom of cylinder 28 fits against a longitudinally corrugated tube 35 which rests on expander cone 36. Below this cone is collet head 37 and a hydraulic cylinder and piston assembly 38 as shown in FIGURE 2. The construction and operation of these elements seem apparent from the drawing. They are described in more detail in Vincent U.S. patent application 216,949.

Below mechanism 33 is a sliding sleeve 40 surrounding polished rod 26 and covering a port 41 through the wall of the polished rod.

In operation, the apparatus of FIGURES 1 and 2 is lowered on the wire line into the well to be lined. When the tool is at the desired level, a go-devil (not shown) is dropped down the wire line. The go-devil strikes the top of rod 19 shearing pin 24 and causing the firing pin to strike cartridge 16. Firing of the cartridge ignites the propellant 20. Gases from the propellant pass through orifice 15 and apply pressure through passage 23 to the base of hydraulic slips 22 pressing these slips against the casing wall. The gas pressure is applied through passages 23 and 27 to the hydraulic cylinder and piston 38 where it acts to force the expander cone 36 and collet head 37 through corrugated tube 35 expanding the tube out against the casing.

When cone 36 reaches rod 34, pressure on the rod actuates firing mechanism 33 which detonates booster charge 30 and explosive lining 29 to destroy frangible cylinder 28. Rod 34 is also made of frangible material such as glass or cast iron so that it is destroyed with cylinder 28, leaving nothing to oppose movement of the expander cone and collet head through the remaining portion of the corrugated tube. Continued rise of cone 36 brings it into contact with sleeve 40, raising this sleeve to uncover port 41. When the port is uncovered, the pressures inside and outside the tool are equalized, releasing slips 22 and permitting the tool to be withdrawn from the well.

In FIGURE 3 the details of one firing mechanism are shown. In this mechanism, rod 34 passes through holder 50 which contains pin 51 passing through rod 34. The pin holds the rod in a position which compresses spring 52. Resting on the top of rod 34 is one end of rocker arm 53. The other end of the rocker arm carries a firing pin 54. The pin is located opposite cartridge 55 set in block 56.

In operation, when the rising expander cone presses against the bottom of rod 34, pin 51 is sheared. Spring 52 then causes pin 54 to strike cartridge 55 sharply to fire the cartridge. This detonates booster ring 30 which in turn detonates explosive lining 29, which destroys frangible sleeve 28. Many other mechanisms for causing pressure on a trigger to fire a cartridge are known in the gun art.

In FIGURE 4 an electric cable 60 is used to lower the tube into the well. A pair of conductors 61 are carried inside tube 62 to a motor and pump assembly (not shown) at the bottom of the tool. The pump generates hydraulic pressure in the annular space between tube 62 and polished rod 26. An example of such a mechanism and its operation are described in the Vincent application to which reference has been previously made. The inside surfaces of slips 22 are exposed to the pressure in space 63.

Another pair of conductors are carried in passage 64 in slips housing 21 to switch 65. Electrical leads 66 pass from switch 65 to blasting cap 67.

In operation, when expander cone 36 presses on rod 34, switch 65 is closed, thus firing cap 67 which detonates lining 29, thus destroying cylinder 28 and rod 34 permitting the expander cone and collet head to complete the expansion of tube 35 out against the casing wall.

In FIGURE 5 the apparatus is much as in FIGURE 4 except that a different type of frangible member is used. The member in this case is an explosive bolt 70. Preferably, more than one is used. The bolt maintains retainer head 71 spaced a distance below slips housing 21 greater than the vertical distance between the top of cone 37 and the outermost point on the arms of collet head 37. In this case, passage 64 carries wires to the explosive bolts. It will be noted, in this case, that the retainer head for holding the top of liner 35 is not a part of slips housing 21 as in FIGURE 1, but is a separate member.

In the operation of this embodiment, the tool is lowered into the well and the liner is partly expanded. The explosive bolts are then fired by a signal from the top of the well. This releases holding head 71 so it can slide up polished rod 26 ahead of expander cone 36 permitting completion of expansion of the corrugated tube.

In FIGURES 6 and 7 the hydraulic piston and cylinder assembly is placed above the expander cone 36 and collet spring head 37. The cone and head are forced downwardly through the corrugated liner 35. In this case, the frangible cylinder 28 and the firing mechanism 33 are placed below the corrugated tube and rest on a bottom retainer head 75. The operation is the same as described in connection with FIGURE 1 except that the motion is downward rather than upward.

The apparatus shown in FIGURES 6 and 7 has the advantage that the broken cylinder falls away from the corrugated tube rather than toward it. The explosive liner is capable of powdering the cylinder, but even the powder may cause some trouble if it falls behind the top portion of the corrugated tube before the tube is expanded. With the frangible cylinder on the bottom, it is even possible to dispense with the explosive liner if desired. The expander cone, in this case, enters the frangible cylinder and breaks it into pieces which fall down the well out of the way of the advancing cone.

Another advantage of the apparatus shown in FIGURES 6 and 7 is that the frangible cylinder may be made of a material such as cast iron or even aluminium. A thin cylinder of cast iron, for example, will be broken apart by the advancing cone and will then fall down past bottom head 75 so the expander cone can continue to advance. If desired, a cylinder of malleable metal may be lined with explosives to split or break the cylinder so it will fall out of the way if the cylinder is below the corrugated tube. If the apparatus of FIGURE 1 is used, however, the cylinder should not ordinarily be made of a malleable material, pieces of which might fall behind the top portion of the corrugated tube before this tube is fully expanded. In all cases a frangible member of brittle material is preferred.

Many embodiments and alternates will be apparent to those skilled in the art. For example, the frangible member may be associated with the holding head even when tubing is used to lower and manipulate the tool in a well. This is particularly advantageous where the string in which the liner is to be set is very small. An example is the use of the liner in one of several strings of tubing in a multiply-completed well. In this case, the macaroni string on which the tool is lowered into the well tubing may not be sufficiently strong to pull or push the expander head through the final portion of the liner.

The slow-burning propellant may be ammonium nitrate in a matrix of rubber, wax, cellulose acetate or the like. Many such materials are now available as rocket propellants. Still other explosives of widely different burning rates are described, for example, in U.S. Patent 2,740,478, Greene. The rate of gas generation and length of burning time can also be controlled by the shape and burning area of the propellant charge. A long narrow charge burning only on one end will burn for a longer time, for example, and generate gas more slowly, than a short charge having a large diameter or a long narrow charge burning at all surfaces.

Still other forms of gas-generating charges may be used. These may, for example, take the form of cylinders of highly-compressed gases such as nitrogen. Acids such as hydrochloric mixed with metals such as zinc or mixtures of sodium hydroxide and aluminum at the bottom of the well will also generate gas.

The explosive inside the frangible member, such as the cylinder or bolt, should be a high explosive such as TNT, PETN, Cyclonite or the like. Particularly in the case of the frangible cylinder, the explosive may be dispersed in a matrix or rubber, wax or the like to decrease the sensitivity of the explosive and thus increase safety. Sheets of such materials are readily available which can be glued, or otherwise attached, to the inside surface of the frangible cylinder.

To ignite the sheet of matrix-suspended explosive, a booster charge of relatively pure explosive such as TNT, PETN or Cyclonite should be used. A sleeve of such material will be detonated by a blasting cap but sometimes may not be detonated by a pistol cartridge. If a cartridge is used, therefore, the booster charge should generally include, opposite the cartridge, a primary explosive such as lead azide, mercury fulminate or the like.

The expander cone and collet spring head make up only one of many systems for expanding the corrugated tube against the inside casing surface. One other such system is shown and described in Vincent U.S. patent application 216,949. Still others will be apparent to those skilled in the art. The Vincent application also describes several glass fiber and plastic coatings which can be used on the outside of the corrugated tube.

Explosive bolts as described in connection with FIGURE 5 can be used in a downwardly acting system such as that shown in FIGURE 6. In this case, the polished rod 26 should extend through the bottom retainer head and should carry a stop at its end. Then when the bolts are fired, the retainer head drops to the bottom of the polished rod. It is possible, whether the expander tool moves upwardly or downwardly, to employ a non-explosive bolt which will hold the relatively small thrust caused by the expander head moving into the bottom of the corrugated tube, but will not withstand the full force of the expander cone when it comes into contact with the retainer head.

In this method of lining casing it is important that after the liner is reformed into a cylindrical shape inside the casing, the liner should be in maximum compressive stress. This is for the purpose of forming and holding a seal between the casing and liner. The casing must be, of course, in sufficient tensile stress to hold the liner in maximum compressive stress. It will be obvious, then, that if the liner and casing are of the same metal, the liner must be thinner than the casing or the maximum tensile strength of the casing will be exceeded and it will burst.

Actually, the casing should be considerably thicker than the liner. This is because after the collet head arms have reformed the liner into substantially cylindrical shape, these arms continue to exert a radial force. Thus, the casing must withstand not only the stress imposed by the liner, but also the stress imposed by the spring arms of the collet head. Ordinarily, the stress resulting from the spring arms is much less than that resulting from the liner. In order to have some margin of safety, however, it is generally advisable to use a steel liner which is not more than about one-half as thick as the steel casing in which it is set.

Of course, there are many types of steel used in wells and the liner can be made either of steel or of several other types of metals or alloys, such as aluminum, aluminum alloys, brass, or the like, to meet special requirements, such as corrosion resistance. The more general limitation can be stated, therefore, that the maximum compressive strength of the material of which the liner is made times the wall thickness of the liner must be less than the maximum tensile strength of the material of which the casing is made times the wall thickness of the casing. This limitation includes the extreme case where the stress imposed by the collet headarms is so small that it can be ignored. Generally, a liner wall thickness of only about one-half the indicated value should be used to allow for a margin of safety.

In order to leave the liner in maximum compressive stress within the casing, it is necessary that the external cross-sectional perimeter of the liner be greater than the internal circumference of the casing. The amount by which the liner wall must be compressed to insure that the liner tube reaches maximum compression is usually less than about ¼ of 1 percent. When a liner of glass fibers and plastic is provided between the liner and the casing, and if the perimeter of the corrugated liner is any greater than the internal circumference of the casing, this requirement is satisfied. The upper limit on the amount by which the corrugated liner perimeter exceeds the internal circumference of the casing is controlled principally by the force required to drive the expanding cone and collet head through the liner. If the corrugated liner perimeter is more than about 10 percent greater than the internal casing circumference, the work required to reform the liner into cylindrical shape inside the casing will be great. The force required to move the expanding heads through the liner at a desirable rate will be correspondingly great. Therefore, the corrugated liner external perimeter should ordinarily not exceed the casing internal circumference by more than about 10 percent.

While many specific designs, embodiments and variations have been described, it will be understood that they are given by way of example only. My invention should not be considered to be limited to these examples. The invention should, rather, be limited only by the following claims.

We claim:

1. Apparatus for placing a metallic liner inside a substantially cylindrical metallic vessel comprising a longitudinally corrugated tube of malleable metal, said tube having an external cross-sectional perimeter greater than the internal cross-sectional circumference of said vessel, the thickness of the wall of said tube times the maximum compressive strength of the metal of which said tube is made being less than the thickness of the wall of said vessel times the maximum tensile strength of the metal of which said vessel is made, an expander tool to be forced through said tube to expand it to a substantially cylindrical form inside said vessel, means for forcing said expander tool through said tube, a retainer head at the end of said tube opposite said expander tool to hold said tube against longitudinal movement when said expander tool is forced through said tube, a frangible member abutting said retainer head and means for breaking said frangible member to permit said expander tool to move through the entire length of said tube.

2. The apparatus of claim 1 in which said frangible member spaces said retainer head from said tube.

3. The apparatus of claim 1 in which said frangible member restrains movement of said retainer head with respect to said tube.

4. The apparatus of claim 1 in which the external cross-sectional perimeter of said tube is no more than about 10 percent greater than the internal cross-sectional circumference of said vessel.

5. Apparatus for placing a metallic liner inside a substantially cylindrical metallic vessel having the axis of the cylinder vertical comprising a longitudinally corrugated tube of malleable metal, said tube having an external cross-sectional perimeter greater than the internal cross-sectional circumference of said vessel, the thickness of the wall of said tube times the maximum compressive strength of the metal of which said tube is made being less than the thickness of the wall of said vessel times the maximum tensile strength of the metal of which said vessel is made, a downwardly moving expander tool above said corrugated tube to expand said tube to a substantially cylindrical form, means for forcing said expander tool downwardly through said tube, a retainer head below said tube to hold said tube against downward motion when said expander tool is forced through said tube, and a frangible member spacing said retainer head from said tube whereby when said expander tool comes in contact with said frangible member, said member is broken, permitting said expander tool to pass through the entire length of said tube.

6. Apparatus for placing a metallic liner inside steel casing in a well comprising a longitudinally corrugated tube of malleable steel, the external cross-sectional perimeter of said tube being greater than the internal cross-sectional circumference of said casing, and the wall thickness of said tube being smaller than the wall thickness of said casing, means for lowering said tube into said well to the desired level, an expander tool to be forced through said tube to expand it to a substantially cylindrical form inside said casing, means for forcing said expander tool through said tube, a retainer head at the end of said tube opposite said expander tool to hold said tube against longitudinal movement when said expander tool is forced through said tube, a frangible member abutting said retainer head and means for breaking said frangible member to permit said expander tool to move through the entire length of said tube.

7. The apparatus of claim 6 in which said frangible member spaces said retainer head from said tube.

8. The apparatus of claim 6 in which said frangible member restrains movement of said retainer head with respect to said tube.

9. The apparatus of claim 6 in which the external cross-sectional perimeter of said tube is no more than about 10 percent greater than the internal cross-sectional circumference of said casing.

10. Apparatus for placing a metallic liner inside steel casing in a well comprising a longitudinally corrugated tube of malleable steel, the external cross-sectional perimeter of said tube being greater than the internal cross-sectional circumference of said casing, and the wall thickness of said tube being smaller than the wall thickness of said casing, means for lowering said tube into said well to the desired level, a downwardly moving expander tool above said corrugated tube to expand said tube to a substantially cylindrical form, means for forcing said expander tool downwardly through said tube, a retainer head below said tube to hold said tube against downward motion when said expander tool is forced through said tube, and a frangible member spacing said retainer head from said tube whereby when said expander tool comes in contact with said frangible member, said member is broken, permitting said expander tool to pass through the entire length of said tube.

11. Apparatus for placing a metallic liner inside a substantially cylindrical metallic vessel comprising a longitudinally corrugated tube of malleable metal, said tube having an external cross sectional perimeter greater than the internal cross-sectional circumference of said vessel, the thickness of the wall of said tube times the maximum compressive strength of the metal of which said tube is made being less than the thickness of the wall of said vessel times the maximum tensile strength of the metal of which said vessel is made, an expander tool to be forced through said tube to expand it to a substantially cylindrical form inside said vessel, means for forcing said expander tool through said tube, a retainer head at the end of said tube opposite said expander tool to hold said tube against longitudinal movement when said expander tool is forced through said tube, and a frangible member restraining movement of said retainer head with respect to said tube whereby when said expander tool comes in contact with said retainer head said frangible member is broken permitting motion of said retainer head and allowing passage of said expander tool through the entire length of said tube.

12. Apparatus for placing a metallic liner inside steel casing in a well comprising a longitudinally corrugated tube of malleable steel, the external cross-sectional perimeter of said tube being greater than the internal cross-sectional circumference of said casing, and the wall thickness of said tube being smaller than the wall thickness of said casing, means for lowering said tube into said well to the desired level, an expander tool to be forced through said tube to expand it to a substantially cylindrical form inside said casing, means for forcing said expander tool through said tube, a retainer head at the end of said tube opposite said expander tool to hold said tube against longitudinal movement when said expander tool is forced through said tube, and a frangible member restraining movement of said retainer head with respect to said tube whereby when said expander tool comes in contact with said retainer head said frangible member is broken permitting motion of said retainer head and allowing passage of said expander tool through the entire length of said tube.

References Cited in the file of this patent
UNITED STATES PATENTS

| | | |
|---|---|---|
| 1,233,888 | Leonard | July 17, 1917 |
| 2,214,226 | English | Sept. 10, 1940 |
| 2,583,316 | Bannister | Jan. 22, 1952 |